Patented Oct. 3, 1950

2,524,112

UNITED STATES PATENT OFFICE 2,524,112

RESINOUS COMPOSITION AND METHOD OF MAKING SAME

Fred G. La Piana, Providence, and Edmund C. Tarnuzzer, Rumford, R. I., assignors to Stein, Hall & Company, Inc., New York, N. Y., a corporation of New York No Drawing. Application September 28, 1945, Serial No. 619,255

7 Claims. (Cl. 260—29.4)

This invention relates to synthetic resinous compositions, and more particularly to lactic acid type resinous compositions containing or formed with an amino-triazine, an aldehyde, and a hydroxy component. These compositions have particularly advantageous film forming characteristics and can be used for a variety of purposes, including the treatment of fibrous materials, such as textiles and paper. They may be used in a variety of ways as explained hereinafter.

The objects achieved by the invention include: the provision of a lactic acid type resinous composition adapted for the treatment of textiles and which does not require an added curing catalyst; the provision of a lactic acid type resinous composition which does not require a relatively high curing temperature and a relatively long curing time; the provision of a lactic acid type resinous composition which does not require an abnormally long curing time at lower curing temperatures; and other objects which will be apparent as the invention is more fully developed hereinafter.

It is appreciated that resins have been proposed heretofore and that resins are being used for the impregnation of textiles in order to impart anti-crease or other properties thereto. There are several drawbacks to the known compositions generally used for this purpose. One such drawback is that the heretofore proposed resinous compositions require a relatively long curing time at a relatively high temperature, and a curing time of about 5 minutes or longer for fixation. Such curing conditions tend to weaken or embrittle the textile fibers. Another disadvantage is the requirement of an acid catalyst in the resin in order to obtain the desired cure. The acid tends to cause a tendering of the textile fiber. Still another drawback is that the treated goods tend to have or develop an odor upon storage, unless such goods are given a thorough washing to remove both the overcured and the undercured resins.

As far as is known, lactic acid type resins have not attained any commercial success. This may be due to the poor hardening characteristics of the resins of this type which have been proposed heretofore and to the impermanence of their properties.

The foregoing disadvantages can be overcome by new lactic acid type resinous compositions which do not require the long curing time at high curing temperature, the addition of an acid catalyst, or an abnormally long drying time.

It has now been found, and with unexpected surprise, that lactic acid type resinous compositions comprising an alpha-hydroxy monocarboxylic acid, such as lactic acid, an amino-triazine having at least one primary amino group, a formaldehyde component, and a substituted ethanol having the general formula

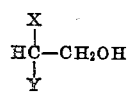

wherein X is a member of the group consisting of H and OH and Y is a member of the group consisting of OH, lower alkyl, lower hydroxy alkyl and lower hydroxy alkyl ether radicals, Y being a member of the group consisting of OH and lower hydroxy alkyl ether radicals when X is H, and being a member of the group consisting of lower alkyl and lower hydroxy alkyl radicals when X is OH, such as a glycol, are admirably adapted for film forming purposes, such as, for instance, for the treatment of textiles and other materials. They impart a characteristic finish. They do not tend to cause embrittlement or tendering of the textile fiber, and the resulting treated materials are free from odor or odor development upon storage. The treated materials are highly resistant to boiling solutions of soap or soda, or both, and do not discolor under the heat of a flat iron. Although the composition does not impart any appreciable stiffness to the materials, it has the capacity of insolubilizing high molecular weight stiffness imparting materials, such as starch or polyvinyl alcohol or the like materials when applied conjointly therewith to the textiles. The resins are suitable as binders for pigments in textile printing, or other printing. The resulting films are substantially permanent and the treated textile has a desirable finish. When properly dried, the thereby treated materials are resistant to the action of enzymes such as diastase or rapidase. They are similarly well adapted for coating paper, and the like fibrous materials and impart desirable characteristics thereto.

The aqueous solutions of the resin used in treating materials will vary in concentrations depending upon the material being treated, the time of contact, etc. Generally a concentration of about 0.5 to about 25 weight percent is preferred.

The exact nature of the chemical reactions occurring in the preparation or curing of the resinous compositions is not understood. The cured resin is water insoluble and no single initial component thereof can be isolated therefrom by boiling or by distillation at lower than thermal decomposition temperatures. However, a condensation by-product, such as water, may be removed.

In a preferred embodiment of the invention, the acid, the formaldehyde component, and the substituted ethanol are first heated together at elevated temperatures, the mass cooled, and then the amino-triazine added thereto. The resulting mass is heated until homogeneous and then cooled rapidly. The ensuing resinous product is clear and water-soluble in all proportions. The order of mixing the components is not critical. The initial reaction should not be carried beyond the point where the product is still water soluble; the reaction time is related to the temperature and can be readily determined by one skilled in the art in view of the examples included hereinafter.

In order to illustrate the invention, but in no sense as a limitation thereof as otherwise disclosed herein, the following specific examples are included.

*Example 1*

40 grams of paraformaldehyde, 20 grams of 50 weight percent aqueous lactic acid, and 30 grams of ethylene glycol were mixed and heated, with agitation, until a temperature of 120° C. was attained. The reaction mass was then clear and liquid. It was cooled to 40° C., and 10 grams of melamine were added. The reaction mass was heated to 64.5° C. with agitation, and then cooled rapidly. The resulting resinous product was water soluble in all proportions; it had a pH of 5.

Films of this composition were cast on a glass plate and heated at from 105° to 110° C. for 10 minutes. The cured films were glass clear, flexible, and completely insoluble in water. Thin films, such as produced on textile fiber by impregnating with a dilute aqueous resin solution and drying, cure in about 30 seconds at about 110° C.

*Example 2*

120 grams of 40 weight percent aqueous formaldehyde, 20 grams of 50 weight percent aqueous lactic acid and 30 grams of ethylene glycol were mixed and heated, with agitation, to the reflux temperature of the mass, cooled to about 40° C., and 10 grams of melamine was added thereto. The reaction mass was heated with agitation to 60° C. and then cooled rapidly. The ensuing resinous composition was clear and water soluble in all proportions; it had a pH of 5.

Films of this resinous composition were cast on a glass plate and heated to from 105° to 110° C. for 10 minutes. The resulting films were clear, flexible, and completely insoluble in water. Thin films, such as produced on textile fibers by impregnating with a dilute aqueous resin solution and drying, cure in about 30 seconds at about 110° C.

In the broader aspects of the invention, the alpha-hydroxy monocarboxylic acids having at least two carbon atoms include for instance, lactic acid, glycollic acid, alpha-hydroxy butyric acid, and ortho hydroxy-benzoic acid. These acids may conveniently be represented by the general formula RCOOH, wherein R is a member of the group consisting of lower alkyl and phenyl radicals substituted in the alpha-position by a hydroxy group. The amino-triazine, having at least one primary amino group, that is, a hydrogen attached to an amino group thereof, may be, for example, melamine, or a substitution derivative thereof, ammeline, or a substitution derivative thereof, or an unsymmetrical aminotriazine. Paraformaldehyde, hexamethylenetetramine, or other substances which can be converted to formaldehyde under the reaction condition may be used as the formaldehyde constituent, and the term "a formaldehyde component" is used herein as generic to all such compounds. The substituted ethanol components include for instance, a glycol, ethylene glycol, di-ethylene glycol, glycerine, propylene glycol-1,2, and 2-amino-2,2-dialkyl-ethanol-1. These beta-substituted ethanols may conveniently be represented by the general formula

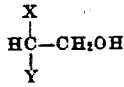

wherein X is H or OH and Y is an OH, lower alkoxy, lower hydroxy alkyl or lower hydroxy alkyl ether radical when X is H or OH and Y is an OH, lower hydroxy alkyl or lower hydroxy alkyl ether radical when X is H.

The proportions of the components may be varied in fairly wide limits. The preferred range is:

Acid component, about 6 to about 20 parts by weight
Amino-triazine component, about 6 to about 20 parts by weight
Formaldehyde component, about 30 to about 60 parts by weight
Ethanol component, about 8 to about 35 parts by weight In order to illustrate the treatment of fibrous materials in accordance with the invention, but not as a limitation of the latter as otherwise disclosed herein, the following examples are included:

*Example 3*

A piece of percale cloth was dipped into an 8 weight percent aqueous solution of the product of Example 1. The excess liquid was removed by squeezing, and the cloth was dried at room temperature. It was then heated to 110° C. for 1 minute for curing. The resulting cloth had a characteristic resilient hand or feel. Upon laundering in an aqueous solution of 0.5 weight percent soap and 0.2 weight percent sodium carbonate at a temperature of 100° C. for one hour and rinsing, followed by drying, the characteristic hand was retained. This test was repeated on the product of Example 2, and similar results were obtained.

*Example 4*

A piece of cotton cloth known as "dotted swiss," 35½ inches wide, containing 60 warp and 48 filling threads per square inch, and weighing one pound per seven running yards of cloth, was passed through a conventional mangle containing an aqueous solution of the composition of Example 1 (2½ gallons of resin diluted with cold water to 25 gallons), and then dried in a tenter frame while holding the cloth to a width of 35 inches. The temperature in the frame housing was 300° F., and the time of passage was 50 seconds. This treatment greatly improved the shrinkage resistance of the cloth. In a washing test, of a modified Sanford Cluett type, a sample of the untreated cloth showed a shrinkage of 8% in length and over 6% in width, whereas the above treated cloth showed a residual shrinkage of 1.7% in length and 1.3% in width. In addition, the treated cloth showed a very desirable permanent "hand" or feel.

The known resins require a cure of about 4 to 5 minutes at 300° F. The less than one minute curing time made possible by the new compositions of the invention results in a marked improvement in the strength of the finished product, over the known materials.

*Example 5*

Strips of unsized paper were impregnated with an aqueous solution of the resin of Example 2 and then dried for thirty seconds under a flat plate ironer. For one set of strips 10% solution, for another set 5% solution, and for a third set 1% solution by volume of resin, was used. The dried strips were then tested by thoroughly wetting the strip and then suspending a pan by means of the strip and adding weights to the pan until the strip broke. The strips measured one inch wide and four inches long between the pan clip and the support slip. The 10% resin solution treatment increased the wet strength eleven times as compared to the untreated paper; the 5% resin showed an increase of 6.8 times, and the 1% resin showed an increase of 3.2 times. The absorption, color, or flexibility characteristics of the treated paper was not materially different from those of the untreated paper, despite the greatly improved wet strength.

Beater pulp may be treated with an aqueous solution of a resin of the invention and then formed into a sheet and dried and heated in the usual paper making manner, whereby the resin is cured. The resulting paper will show an increased wet strength and dry strength.

*Example 6*

A piece of 80 square percale cloth was impregnated with a 20% by weight aqueous solution of the resin of Example 1, squeezed and lightly dried. It was then passed through a friction calendar, with a speed ratio of upper bowl to lower bowl of 3.5:1 and a bowl temperature of 350° F., repassed therethrough under the same conditions, and cooled. The cloth showed a very high lustre. It was washed by boiling in an 0.5% soap and 0.25% by weight soda ash solution in water, rinsed and dried. It still retained the very high lustre.

A similar cloth, glazed with a conventional resin under the above conditions, does not retain its lustre unless subjected to an additional curing at about 300° F. for about 4 to 5 minutes. The latter treatment lowers the strength of the cloth.

The new resinous compositions made possible the curing of the treated fibrous materials at lower curing temperatures without increasing the conventional curing time. This results in improving the strength of the final product, as compared to known treating compositions.

*Example 7*

A piece of 76 x 72 percale cloth was padded with 200 grams of a starch solution (made up by cooking a thin boiling corn starch in water at a concentration of 2 pounds per gallon). The cloth was then squeezed to remove excess solution and dried. A second piece of cloth was padded with a solution containing 200 grams of the above starch solution and 10 grams of the resin of Example 2, squeezed and dried. Both pieces of cloth were then treated with an amylolytic enzyme, boiled in aqueous soap solution, rinsed and dried. The starch treated fabric lost its stiffness and returned to its original limp state. The starch-resin treated cloth retained the stiffness imparted thereto by the starch-resin solution, unimpaired by the enzyme and soap treatment.

The starch in the above example can be replaced in whole or in part by a polyvinyl alcohol dispersion, or by a locust bean gum or mucilage, or both, without affecting the permanency of the resulting finish. The concentration of the resin can be varied within wide limits without affecting the permanency; distinct "hands" or "feels" are associated with the different stiffening agents and concentrations of the resin in the solution.

*Example 8*

A piece of cloth was printed with an engraved copper roller on a printing machine using a printing paste of the following composition:

5.13 grams corn starch
0.27 grams locust bean gum
4.5 grams resin of Example 1
84.6 grams water
0.5 gram concentrated aqueous ammonia
5.0 grams blue pigment powder (known as "Monastral Fast Blue BWD")

The cloth was then dried on a heated metal roll. The resulting print showed excellent color value and was very fast to washing with boiling soap and soda solution, enzyme action, and exposure to sunlight. Ordinarily, print color compositions require further curing, heat treatments, or after treatments, after drying. The compositions of the invention eliminate the need of these after treatments.

*Example 9*

A piece of percale cloth was padded with a bath of the following composition:

5 grams Monastral Fast Green GFP (powder)
85 cc. lukewarm water
10 cc. resin of Example 2 and thoroughly dried. The cloth was then boiled with aqueous soap and soda ash solution. The pigment was not removed thereby and there was no loss of depth of shade. A similarly treated cloth was exposed to a carbon arc lamp and then washed. There was no loss of depth in shade or removal of the pigment thereby.

*Example 10*

A piece of percale cloth was padded with a composition consisting of the composition of Example 9 plus 10 cc. of a 2% solution of polyvinyl alcohol, and dried. In addition to the color acquired, the cloth simultaneously acquired a permanent finish or "hand." These characteristics were not removed by washing or carbon arc irradiation, or both.

*Example 11*

Two pieces of cotton cloth were dyed with a direct dye. One of these was then treated with a composition consisting of 10 cc. of the resin of Example 2 and 85 cc. of lukewarm water, and then dried. Both pieces were then washed. The untreated piece was not fast to washing and lost much of its color. The treated piece was resistant to the washing treatment and retained its color. The untreated piece bled when washed with a piece of lighter colored fabric, whereas the treated piece did not bleed. Irradiation by sunlight, or a carbon arc lamp, followed by washing, did not reduce the depth of shade of the treated cloth.

The resinous composition may be in the aqueous phase of an emulsion. For example, an aqueous dispersion of the resin may be emulsified with an evaporative organic solvent, such as a hydrocarbon, and suitable emulsifying agents may be included. Preferably the aqueous phase is the outer phase but under some circumstances the phase relationship may be reversed. The non-aqueous phase may also include a flexible material such as rubber, or a vulcanized oil. Such emulsions break upon application and drying, leaving the resin distributed in a form depending on the emulsion and its components.

The resin can be used along with plasticizers, extenders or modifying agents, including those of a resinous nature, without departing from the invention.

In view of the foregoing disclosure, variations and modifications thereof will be apparent to one skilled in the art. The invention includes all such variations and modifications as come within the scope of the appended claims.

We claim:

1. An aqueous solution of a resinous composition comprising a reaction product prepared by reacting, as the sole reactants, (1) from 6 to 20 parts by weight of an alpha-hydroxy-monocarboxylic acid having the general formula RCOOH, wherein R is a member of the group consisting of lower alkyl and phenyl radicals substituted in the alpha-position by a hydroxy group, (2) from 6 to 20 parts by weight of an amino-triazine having at least one primary amino group, (3) from 30 to 60 parts by weight of an aldehyde component, and (4) from 8 to 35 parts by weight of an ethanol having the general formula

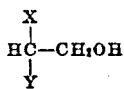

wherein X is a member of the group consisting of H and OH and Y is a member of the group consisting of OH, lower alkyl, lower hydroxy alkyl and lower hydroxy alkyl ether radicals, Y being a member of the group consisting of OH and lower hydroxy alkyl ether radicals when X is H, and being a member of the group consisting of lower alkyl and lower hydroxy alkyl radicals when X is OH.

2. An aqueous solution of a resinous composition comprising a reaction product prepared by reacting, as the sole reactants, (1) from 6 to 20 parts by weight of an alpha-hydroxy-monocarboxylic acid having the general formula RCOOH, wherein R is a member of the group consisting of lower alkyl and phenyl radicals substituted in the alpha-position by a hydroxy group, (2) from 6 to 20 parts by weight of an amino-triazine having at least one primary amino group, (3) from 30 to 60 parts by weight of an aldehyde component, and (4) from 8 to 35 parts by weight of a glycol.

3. An aqueous solution of a resinous composition comprising a reaction product prepared by reacting, as the sole reactants, from 6 to 20 parts by weight of lactic acid, from 6 to 20 parts by weight of melamine, from 30 to 60 parts by weight of formaldehyde, and from 8 to 35 parts by weight of a glycol.

4. A method of making a resinous composition which comprises mixing, as the sole reactants, in the presence of water, (1) from 6 to 20 parts by weight of an alpha-hydroxy-monocarboxylic acid having the general formula RCOOH, wherein R is a member of the group consisting of lower alkyl and phenyl radicals substituted in the alpha-position by a hydroxy group, (2) from 30 to 60 parts by weight of an aldehyde component, and (3) from 8 to 35 parts by weight of an ethanol having the general formula

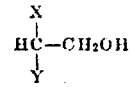

wherein X is a member of the group consisting of H and OH and Y is a member of the group consisting of OH, lower alkyl, lower hydroxy alkyl and lower hydroxy alkyl ether radicals, Y being a member of the group consisting of OH and lower hydroxy alkyl ether radicals when X is H, and being a member of the group consisting of lower alkyl and lower hydroxy alkyl radicals when X is OH, heating with agitation until the reaction mass is clear, cooling to about 30° to 50° C., adding from 6 to 20 parts by weight of an amino-triazine having at least one primary amino group, heating at about 55° to 75° C. until the reaction mass is clear, and cooling to room temperature.

5. A method of making a resinous composition which comprises mixing, as the sole reactants in the presence of water, (1) from 6 to 20 parts by weight of an alpha-hydroxy-monocarboxylic acid having the general formula RCOOH, wherein R is a member of the group consisting of lower alkyl and phenyl radicals substituted in the alpha-position by a hydroxy group, (2) from 30 to 60 parts by weight of an aldehyde component, and (3) from 8 to 35 parts by weight of an ethanol having the general formula $$H\overset{X}{\underset{Y}{C}}-CH_2OH$$

wherein X is a member of the group consisting of H and OH and Y is a member of the group consisting of OH, lower alkyl, lower hydroxy alkyl and lower hydroxy alkyl ether radicals, Y being a member of the group consisting of OH and lower hydroxy alkyl ether radicals when X is H, and being a member of the group consisting of lower alkyl and lower hydroxy alkyl radicals when X is OH, heating with agitation until the reaction mass is clear, cooling to about 30° to 50° C., adding from 6 to 20 parts by weight of melamine, heating at about 55° to 75° C. until the reaction mass is clear, and cooling to room temperature.

6. Method of making a resinous composition which comprises mixing, in the presence of water, from 6 to 20 parts by weight of lactic acid, from 30 to 60 parts by weight of formaldehyde, and from 8 to 35 parts by weight of ethylene glycol, heating with agitation until the reaction mass is clear, cooling to about 30° to 50° C., adding from 6 to 20 parts by weight of an amino-triazine having at least one primary amino group, heating with agitation at about 55° to 75° C. until the reaction mass is clear, and cooling to room temperature.

7. Method of making a resinous composition which comprises mixing, in the presence of water, from 6 to 20 parts by weight of lactic acid, from 30 to 60 parts by weight of formaldehyde, and from 8 to 35 parts by weight of ethylene glycol, heating with agitation until the reaction mass is clear, cooling to about 30° to 50° C., adding from 6 to 20 parts by weight of melamine, heating with agitation at about 55°–75° C. until the reaction mass is clear, and cooling to room temperature.

FRED G. LA PIANA.
EDMUND C. TARNUZZER.

REFERENCES CITED

The following references are of record in the file of this patent:

UNITED STATES PATENTS

| Number | Name | Date |
|---|---|---|
| 2,136,110 | Lane | Nov. 8, 1938 |
| 2,191,362 | Widmer | Feb. 20, 1940 |
| 2,197,357 | Widmer | Apr. 16, 1940 |
| 2,197,442 | Widmer | Apr. 16, 1940 |
| 2,209,292 | Berger | July 23, 1940 |
| 2,248,696 | Cassel | July 8, 1941 |
| 2,317,181 | D'Alelio | Apr. 20, 1943 |
| 2,322,887 | Schwartz | June 29, 1943 |
| 2,338,602 | Schur | Jan. 4, 1944 |
| 2,342,641 | Cassel | Feb. 29, 1944 |
| 2,365,813 | Gluesenkamp | Dec. 26, 1944 |
| 2,368,451 | D'Alelio | Jan. 30, 1945 |
| 2,394,289 | Boughton | Feb. 5, 1946 |
| 2,417,014 | Pollard | Mar. 4, 1947 |

OTHER REFERENCES

Taft, Paper Trade J., Oct. 15, 1942, pages 30–32.
De Buccar, Chem. Abstracts, vol. 37, page 3603 (1943).
Weber et al., Paper Industry and Paper World, Nov. 1946, pages 1138, 1139.